(12) United States Patent
Plusquellic et al.

(10) Patent No.: US 10,956,557 B2
(45) Date of Patent: Mar. 23, 2021

(54) PRIVACY-PRESERVING, MUTUAL PUF-BASED AUTHENTICATION PROTOCOL

(71) Applicant: STC.UNM, Albuquerque, NM (US)

(72) Inventors: James Plusquellic, Albuquerque, NM (US); Wenjie Che, Albuquerque, NM (US); Dylan Ismari, Albuquerque, NM (US)

(*) Notice: Subject to any disclaimer, the term of this patent is extended or adjusted under 35 U.S.C. 154(b) by 142 days.

(21) Appl. No.: 16/067,757

(22) PCT Filed: Jan. 11, 2017

(86) PCT No.: PCT/US2017/013013
§ 371 (c)(1),
(2) Date: Jul. 2, 2018

(87) PCT Pub. No.: WO2017/123631
PCT Pub. Date: Jul. 20, 2017

(65) Prior Publication Data
US 2019/0026457 A1   Jan. 24, 2019

Related U.S. Application Data

(60) Provisional application No. 62/277,276, filed on Jan. 11, 2016, provisional application No. 62/296,490,
(Continued)

(51) Int. Cl.
| | |
|---|---|
| *G06F 21/44* | (2013.01) |
| *G06F 21/70* | (2013.01) |
| *G06F 21/30* | (2013.01) |
| *G06F 21/73* | (2013.01) |
| *H04L 9/08* | (2006.01) |
| *H04L 9/32* | (2006.01) |

(Continued)

(52) U.S. Cl.
CPC .......... *G06F 21/445* (2013.01); *G06F 21/30* (2013.01); *G06F 21/44* (2013.01); *G06F 21/70* (2013.01);
(Continued)

(58) Field of Classification Search
CPC ........ G06F 21/445; G06F 21/44; G06F 21/30; G06F 21/70; G06F 21/73; G06F 7/588;
(Continued)

(56) References Cited

U.S. PATENT DOCUMENTS

| | | | | |
|---|---|---|---|---|
| 7,898,283 | B1* | 3/2011 | Koushanfar | .......... H04L 9/3278 |
| | | | | 326/8 |
| 8,667,265 | B1* | 3/2014 | Hamlet | ................. H04L 9/0866 |
| | | | | 326/80 |

(Continued)

FOREIGN PATENT DOCUMENTS

| | | |
|---|---|---|
| WO | 2015031683 A1 | 3/2015 |
| WO | 2015105687 | 7/2015 |
| WO | 2016100402 A1 | 6/2016 |

OTHER PUBLICATIONS

Morozov, Sergey et al. "An analysis of delay based PUF implementations on FPGA." Reconfigurable Computing: Architectures, Tools and Applications. Springer Berlin Heidelberg, 2010. 382-387. (Year: 2010).*

(Continued)

*Primary Examiner* — Darren B Schwartz
(74) *Attorney, Agent, or Firm* — Valauskas Corder LLC

(57) ABSTRACT

An authentication protocol using a Hardware-Embedded Delay PUF ("HELP"), which derives randomness from within-die path delay variations that occur along the paths within a hardware implementation of a cryptographic primitive, for example, the Advanced Encryption Standard ("AES") algorithm or Secure Hash Algorithm 3 ("SHA-3"). The digitized timing values which represent the path delays are stored in a database on a secure server (verifier) as an alternative to storing PUF response bitstrings thereby enabling the development of an efficient authentication protocol that provides both privacy and mutual authentication.

12 Claims, 11 Drawing Sheets

Related U.S. Application Data filed on Feb. 17, 2016, provisional application No. 62/344,754, filed on Jun. 2, 2016, provisional application No. 62/417,611, filed on Nov. 4, 2016.

(51) Int. Cl.
   *H04L 9/06*       (2006.01)
   *G06F 7/58*       (2006.01)
   *G06F 21/34*      (2013.01)

(52) U.S. Cl.
   CPC ............ *G06F 21/73* (2013.01); *H04L 9/0662* (2013.01); *H04L 9/0866* (2013.01); *H04L 9/3234* (2013.01); *H04L 9/3278* (2013.01); *G06F 7/588* (2013.01); *H04L 2209/08* (2013.01); *H04L 2209/12* (2013.01)

(58) Field of Classification Search
   CPC ..... G06F 21/34; H04L 9/0866; H04L 9/0662; H04L 9/3278; H04L 2209/12; H04L 2209/08; H04L 9/3234
   See application file for complete search history.

(56) References Cited

U.S. PATENT DOCUMENTS

| | | | |
|---|---|---|---|
| 2009/0083833 A1* | 3/2009 | Ziola ................ | H04L 9/3271 726/2 |
| 2009/0183248 A1 | 7/2009 | Tuyls et al. | |
| 2010/0250936 A1* | 9/2010 | Kusakawa ............ | H04L 9/3278 713/169 |
| 2012/0131340 A1* | 5/2012 | Teuwen ................ | H04L 9/3278 713/168 |
| 2012/0183135 A1 | 7/2012 | Paral et al. | |
| 2012/0204023 A1* | 8/2012 | Kuipers ................ | H04L 9/0866 713/150 |
| 2013/0010957 A1* | 1/2013 | Yu ........................ | H04L 9/0844 380/260 |
| 2013/0133031 A1* | 5/2013 | Fainstein ................ | G06F 21/73 726/2 |
| 2013/0276059 A1* | 10/2013 | Lewis ..................... | G06F 21/44 726/2 |
| 2014/0189890 A1* | 7/2014 | Koeberl ................ | H04L 9/0866 726/34 |
| 2014/0201851 A1* | 7/2014 | Guo ......................... | G06F 1/26 726/34 |
| 2015/0058928 A1* | 2/2015 | Guo ......................... | H04L 63/08 726/3 |
| 2015/0086016 A1* | 3/2015 | Oshida ................. | H04L 9/0822 380/255 |
| 2015/0101037 A1* | 4/2015 | Yang ..................... | H04L 9/3278 726/16 |
| 2015/0169247 A1 | 6/2015 | Wang et al. | |
| 2015/0180654 A1* | 6/2015 | Falk ......................... | G09C 1/00 380/44 |
| 2015/0195088 A1* | 7/2015 | Rostami ................ | H04L 9/3278 380/28 |
| 2015/0278505 A1* | 10/2015 | Lu ........................... | G06F 21/44 726/19 |
| 2016/0087805 A1* | 3/2016 | Li ......................... | H04L 9/0866 713/193 |
| 2016/0342777 A1* | 11/2016 | Sadhasivan ............ | H04L 63/061 |
| 2017/0134175 A1* | 5/2017 | Skudlarek ................ | G09C 1/00 |

OTHER PUBLICATIONS

Gassend, B., et al. "Delay-Based Circuit Authentication and Applications." Proceedings of the 2003 ACM symposium on Applied Computing, pp. 294-301 (2003). (Year: 2003).*

D. Suzuki and K. Shimizu, "The glitch PUF: a new delay-PUF architecture exploiting glitch shapes," in Proceedings of the 12th International Conference on Cryptographic Hardware and Embedded Systems (CHES '10), pp. 366-382, San Diego, Calif, USA, 2010. (Year: 2010).*

Aarestad, J. et al. "HELP: A Hardware-Embedded Delay PUF." IEEE Design & Test of Computers, vol. 30, No. 02, pp. 17-25, May 2013. (Year: 2013).*

R. Bassil, et al. "A PUF-based ultra-lightweight mutual-authentication RFID protocol," 2011 International Conference for Internet Technology and Secured Transactions, Abu Dhabi, 2011, pp. 495-499. (Year: 2011).*

Van Herrewege et al., "Reverse Fuzzy Extractors: Enabling Lightweight Mutual Authentication for PUF-enabled RFIDs", vol. 7397 of Lecture Notes in Computer Science, 2012, pp. 374-389.

Tiri et al., "A Logic Level Design Methodology for a Secure DPA Resistant ASIC or FPGA Implementation", Date, 2004, pp. 246-251.

Konigsmark et al., "System-of-PUFs: Multilevel Security for Embedded Systems", Codes, pp. 27:1-27:10, 2014.

Aysu et al., "End to-end Design of a PUF-based Privacy Preserving Authentication Protocol", Ches, 2015.

International Search Report & Written Opinion—Russian Federation (Rospatent).

J. Aarestad et al., HELP: A Hardware-Embedded Delay PUF., IEEE Design & Test, May 29, 2013.

European Search Report, dated Jul. 16, 2019.

Aharon, M., et al., "K-SVD: An Algorithm for Designing Overcomplete Dictionaries for Sparse Representation", IEEE Transactions on signal processing, Nov. 2006, 4311-4322.

Allen, E.A., et al., "Tracking Whole-Brain Connectivity Dynamics in the Resting State", Cereb Cortex, Mar. 2014, 24, 663-676.

Allen, E.A., et al., "A baseline for the multivariate comparison of resting-state networks", Front System Neuroscience, Feb. 2011, 5, 2.

Battaglia, D., Thomas, "Functional Connectivity Dynamics of the Resting State across the Human Adult Lifespan", bioRxiv, Feb. 2017.

Calhoun, V.D., et al., "Multisubject independent component analysis of fMRI: a decade of intrinsic networks, default mode, and neurodiagnostic discovery", 2012, IEEE Rev Biomed Eng 5, 60-73.

Calhoun, V.D., et al., "A method for making group inferences from functional MRI data using independent component analysis", 2001, Human Brain Mapping 14, 140-151.

Chang, C., et al., 2010. "Time-frequency dynamics of resting-state brain connectivity measured with fMRI". Neuroimage 50, 81-98.

Chen, J.E., et al., 2015. "Bold fractional contribution to resting-state functional connectivity above 0.1 Hz". Neuroimage 107, 207-218.

Chen, J.E., et al., 2017. "Nuisance Regression of High-Frequency Functional Magnetic Resonance Imaging Data: Denoising Can Be Noisy". Brain Connect.

Eavani, H., et al., 2013. Unsupervised learning of functional network dynamics in resting state fMRI. Inf Process Med Imaging 23, 426-437.

Erhardt, E.B., et al., 2011. Comparison of Multi-Subject ICA Methods for Analysis of fMRI Data. Human Brain Mapping 32, 2075-2095.

Ferri, C.P., et al., Alzheimer's Disease, I., 2005. "Global prevalence of dementia: a Delphi consensus study". Lancet 366, 2112-2117.

Friston, K.J., et al., 1997. "Psychophysiological and modulatory interactions in neuroimaging". Neuroimage 6, 218-229.

Handwerker, D.A., et al., 2012. "Periodic changes in fMRI connectivity". Neuroimage 63, 1712-1719.

Hutchison, R.M., et al., 2013. "Dynamic functional connectivity: promise, issues, and interpretations". Neuroimage 80, 360-378.

Kaiser, R.H., et al., 2016. "Dynamic Resting-State Functional Connectivity in Major Depression". Neuropsychopharmacology 41, 1822-1830.

Kim, J., et al., 2008. "Investigating the neural basis for fMRI-based functional connectivity in a blocked design: application to interregional correlations and psycho-physiological interactions". Magn Reson Imaging 26, 583-593.

(56) References Cited

OTHER PUBLICATIONS

Liu, X., et al., 2013. "Time-varying functional network information extracted from brief instances of spontaneous brain activity". Proceedings of the National Academy of Sciences of the United States of America 110, 4392-4397.

Ma, S., et al., 2011. "Automatic identification of functional clusters in FMRI data using spatial dependence". IEEE Trans Biomed Eng 58, 3406-3417.

Rashid, B., et al., 2014. "Dynamic Connectivity States Estimated from Resting fMRI Identify Differences among Schizophrenia, Bipolar Disorder, and Healthy Control Subjects". Frontiers in Human Neuroscience 8.

Service, S.K., et al., 2014. "Re-sequencing Expands Our Understanding of the Phenotypic Impact of Variants at GWAS Loci". Plos Genetics 10.

Shakil, S., et al., 2016. "Evaluation of sliding window correlation performance for characterizing dynamic functional connectivity and brain states". Neuroimage 133, 111-128.

Trapp, C., et al., 2017. "On the detection of high frequency correlations in resting state fMRI". Neuroimage.

Yaesoubi, M., et al., 2015. "Dynamic coherence analysis of resting fMRI data to jointly capture state-based phase, frequency, and time-domain information". Neuroimage 120, 133-142.

Yaesoubi, M., et al., 2015. "Mutually temporally independent connectivity patterns: A new framework to study the dynamics of brain connectivity at rest with application to explain group difference based on gender". Neuroimage 107, 85-94.

Calhoun, Vince D., et al., "The Chronnectome: Time-Varying Connectivity Networks as the Next Frontier in fMRI Data Discovery". Neuron, 2014. 84(2): p. 262-274.

Leonardi, N., et al., Principal components of functional connectivity: a new approach to study dynamic brain connectivity during rest. Neuroimage, 2013. 83: p. 937-50.

* cited by examiner

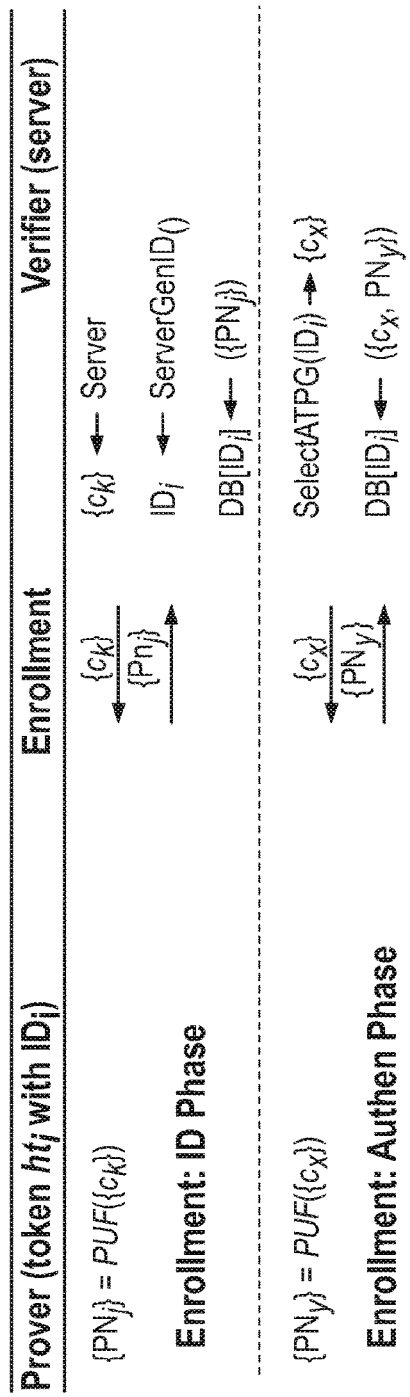
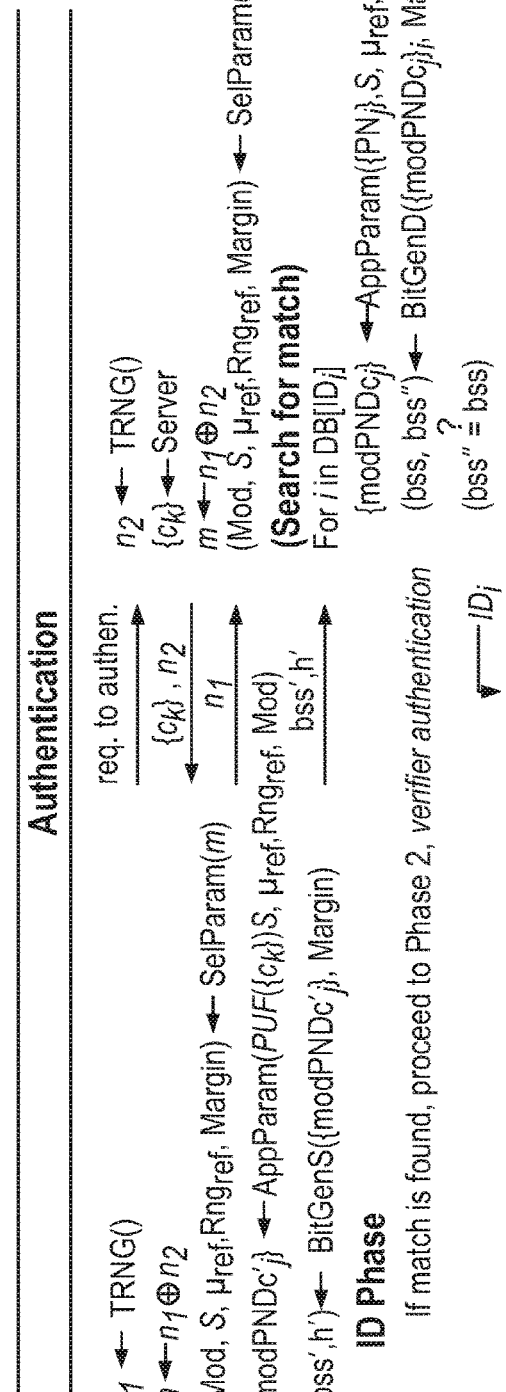
FIG. 5A
FIG. 5B

| Activity / Component | LUTS | FFs | Time(us) |
|---|---|---|---|
| *ID Phase* | | | |
| Network delay | - | - | 44347 |
| PN generation using *sbox-mixedcol* | 3170 | 128 | 577834 |
| Token timing engine | 721 | 828 | |
| Token bitstring gen. engine | 1104 | 385 | 2359 |
| Token controller and I/O | 705 | 297 | - |
| Verifier authentication | - | - | 80 |
| *Mutual Phase* | | | |
| Network+ verifier delays | - | - | 50830 |
| Verifirer bitstring gen. | - | - | 54 |
| Token timing engine+bitgen engine | - | - | 577037 |
| Token authentication | 338 | 86 | 571 |
| TOTALS | 6038 | 1724 | 1.25 sec |

FIG. 12

PRIVACY-PRESERVING, MUTUAL PUF-BASED AUTHENTICATION PROTOCOL

CROSS-REFERENCE TO RELATED APPLICATIONS

This application claims the benefit of U.S. Provisional Application No. 62/277,276 filed on Jan. 11, 2016, U.S. Provisional Application No. 62/296,490 filed on Feb. 17, 2016, U.S. Provisional Application No. 62/344,754 filed on Jun. 2, 2016, and U.S. Provisional Application No. 62/417,611 filed on Nov. 4, 2016, each incorporated by reference.

STATEMENT FEDERALLY SPONSORED RESEARCH OR DEVELOPMENT

This invention was made with government support under 271368 awarded by National Science Foundation. The government has certain rights in the invention.

FIELD OF THE INVENTION

The invention relates to authentication protocols for a Physically Unclonable Function ("PUF") including a Hardware-embedded Delay PUF ("HELP") such as that disclosed in International Patent Application PCT/US14/053276 filed Aug. 28, 2014, and International Patent Application PCT/US15/065909 filed Dec. 15, 2015, each incorporated by reference. In particular, the invention relates to authentication protocols that provide both privacy and mutual identification.

BACKGROUND OF THE INVENTION

An integrated circuit ("IC"), also known as a chip or a microchip, is a miniaturized electronic circuit used in electronic equipment such as computer, telephone, and digital applications. An IC is typically formed of semiconductor devices, such as silicon and germanium, as well as passive components such as capacitors, resistors, and diodes. Usually, an IC is manufactured on a thin substrate of semiconductor material. In recent years, cost in manufacturing of ICs, per transistor, has decreased. However, while lower cost increases the availability of manufacturing, ICs must be protected from threats such as cloning or copying as well as protected against misappropriation and unauthorized use. Threats may allow unauthorized access to encrypted data, replication of IC design including unauthorized use of intellectual property ("IP") and hardware piracy or the illegal manufacturing of the ICs. Threats of cloning, misappropriation and unauthorized use of a security key are a problem, particularly in computer applications that use a security key in authentication protocols.

Many computer-based hardware security schemes exist to protect ICs from cloning and unauthorized use. These security schemes depend on accessibility to a security key or signature, such as a unique unclonable identifier derived from each IC. Security keys define the basis of computer-based hardware security mechanisms implemented at high levels of hardware security such as those mechanisms that perform encryption of data communication channels, or provide IP theft protection in computer-based logic devices including Field-Programmable Gate Arrays ("FPGAs").

Conventional security keys are defined using digital data stored, for example, in a flash memory or read only memory ("ROM") on the IC. From a security perspective, it is desirable that access to the security key is restricted to hardware circuits formed on the IC. Unfortunately, security keys stored using these conventional technologies are subject to invasive physical attacks which can allow an adversary to learn the secret key. If the secret key is learned by an adversary, then clones ICs can be created and security protocols can be compromised.

Random bitstrings may form the basis for encryption, identification, authentication, and feature activation in hardware security. In current technologies, keying material for encryption may be stored as digital bitstrings in non-volatile memory on FPGAs and Application Specific Integrated Circuit ("ASICs"). However, secrets stored this way may not be secure against a determined adversary, who can use probing attacks to steal the secret. Physical Unclonable Functions ("PUFs") may be used as alternative to storing digital bitstrings in non-volatile memory. A PUF refers to an IC hardware primitive that leverages entropy introduced by manufacturing variations to produce bitstrings, and may incorporate an on-chip infrastructure for measuring and digitizing the corresponding variations. PUFs may measure and digitize the natural variations that occur in path delays, leakage current, or static random access memory ("SRAM") power-up patterns, to produce a random bitstring.

Various techniques have been proposed to protect ICs using PUF implementations. Challenge-based IC authentication is one example. With challenge-based IC authentication, a secret key is embedded in the IC that enables the IC to generate a unique response to a challenge, which is valid only for that challenge. Thus, the key remains secret and the mechanism performing authentication is resistant to spoofing. Remote activation schemes are another example. Remote activation schemes enable IC designers to lock each IC at start-up and then enable it remotely, providing intellectual property protection and hardware metering. States are added to the finite state machine ("FSM") of a design and control signals are added which are a function of the secret key. Therefore, the hardware locks up until receipt of a specific activation code. Other examples of PUF implementations include mismatched delay-lines, SRAM power-on patterns, metal-oxide semiconductor ("MOS") device mismatches and input dependent leakage patterns. However, each of these techniques has vulnerabilities related to misappropriation, cloning or unauthorized use of a security key for an IC.

A PUF extracts entropy (randomness) from variations in the physical and electrical properties of ICs, which are unique to each IC, as a means of generating digital secrets (bitstrings). The bitstrings can serve the role of uniquely identifying the hardware tokens for authentication applications. The bitstrings are generated on-the-fly, thereby eliminating the need to store digital copies of them in non-volatile memory ("NVM"), and are (ideally) reproducible under a range of environmental variations. The ability to control the precise generation time of the secret bitstring and the sensitivity of the PUF entropy source to invasive probing attacks (which act to invalidate it) are additional attributes that make them attractive for authentication in embedded hardware including resource-constrained hardware tokens.

PUFs may be classified as a "strong PUF" or a "weak PUF". "Strong PUFs" may reduce area and energy overheads by reducing the number and type of cryptographic primitives and operations. For example, a strong PUF is capable of producing a large, unique set of bits per device, and has additional challenges that relate to machine learning attacks, protocol attacks and constraints on device resources. In contrast, area overhead restricts the physical size of the entropy source in a "weak PUF".

Most proposed "weak PUF" architectures require the insertion of a dedicated array of identically-designed test structures to serve as the entropy source in which the area overhead restricts the physical size of the entropy source. Although "weak PUFs" can be used for authentication, they require the insertion of obfuscation functions, e.g., cryptographic hash, encryption and XOR functions, to protect their limited amount entropy against adversarial interface attacks designed to machine learn the secrets.

On the other hand, most "strong PUFs" circumvent the limited amount of entropy within specialized test structures by leveraging the entropy available in existing on-chip resources. A "strong PUF" is able to produce a very large number of challenge-response-pairs ("CRPs") for authentication operations.

What is known as the "arbiter PUF" is traditionally regarded as the first strong PUF because it can be configured to product $2^n$ responses. However, the arbiter PUF is vulnerable to model-building attacks since only a small number of gates define the paths. In particular, an arbiter PUF is typically configures with as few as 256 logic gates making it susceptible to machine learning ("ML") attacks.

The simplest form of a PUF-based authentication protocol is carried out in two phases: enrollment and authentication. The process of preparing a hardware token for authentication operations in the field is called enrollment. During enrollment, a secure server randomly selects a small subset of challenges that are applied to the PUF to generate a corresponding set of responses. The CRPs for each token are then recorded by the server in a secure database, which are then later used for authenticating the fielded token. The number of stored CRPs for each token can be small because the large CPRs space along with the secrecy of the selected subset make it very difficult for adversaries to build a clone to impersonate the token. Authentication is the process between a prover—e.g., a hardware token or smart card—and a verifier—a secure server or bank—that confirms identities using corroborative evidence of one or both parties. With the network of physical objects embedded with electronics, software, sensors, and network connectivity enabling the collection and exchange of data—referred to as the Internet-of-things ("IoT")—there are a growing number of applications in which the hardware token is resource-constrained, and therefore, novel authentication techniques are required that are low in cost, energy and area overhead.

However, this simple form of a PUF-based authentication protocol has several drawbacks. First, it does not provide privacy for the authenticating token, and therefore, adversaries will be able to track a fielded token across successive authentications. This is true because the token must first identify itself to the verifier using some type of token-ID to enable the verifier to select the proper CRP set. The token-ID is required because only a small, undisclosed, subset of the CRPs are recorded on the verifier for each token during enrollment. The token-ID must also be stored permanently on the token, e.g., 'burned in' using fuses, and must be sent in the clear. CRP chaining and encryption schemes have been proposed to avoid this, but incur additionally overhead because they require a read-writable NVM to implement the chaining component.

Second, this simple form of a PUF-based authentication protocol is susceptible to denial-of-service ("DOS") attacks, whereby an adversary depletes the verifier's CRPs for a token by repeatedly attempting to authenticate. Third, even when DOS attacks are not attempted, the stored CRPs can be exhausted in the course of a sequence of valid authentications because the verifier must delete a CRP once it is used (to avoid replay attacks), and the verifier stores only a fixed number of CRPs for each token.

Protocols have been proposed to use delay variations in functional units for authentication. However, these protocols make use of the timing values directly, and do not account for path length bias effects. A weakness in existing protocols relates to weaknesses in the PUF's entropy source. Other protocols are not lightweight such as a recently proposed protocol that supports privacy-preserving and mutual authentication which makes use of a weak SRAM PUF, and requires NVM and several cryptographic functions to be implemented on the token. Conventional methods of authentication which use area-heavy cryptographic primitives and non-volatile memory ("NVM") are less attractive for evolving embedded applications.

There is a demand for reliability and security enhancing techniques in order to provide a truly strong PUF with great cryptographic properties. The invention satisfies this demand.

SUMMARY OF THE INVENTION

The invention is directed to a PUF-based, end-to-end privacy-preserving, mutual PUF-based authentication protocol that provides a truly strong PUF with cryptographic properties.

The invention provides a PUF-based, mutual, privacy preserving authentication protocol. Although the protocol is described and implemented using a Hardware-embedded delay PUF ("HELP"), any Physical Unclonable Functions ("PUFs") is contemplated. Advantageously, the protocol does not require non-volatile memory or cryptographic primitives on the token. Furthermore, path delay information is stored on the verifier during enrollment instead of response bitstrings.

The Hardware embedded Delay PUF ("HELP") is a strong PUF that leverages path delay variations in a functional unit. In particular, HELP generates bitstrings from delay variations that exist within existing functional units and provides a large number of CRPs. Moreover, the paths defined by the functional unit have a complex interconnection structure, requiring long runtimes of sophisticated automatic test pattern generation (ATPG) software to determine the test sequences required to test them. The difficulty of generating challenges for HELP adds a new dimension to the difficulty of carrying out model-building attacks because the adversary must first expend a great deal of effort to determine the challenges that enable an effective model-building strategy. It can be argued that this effort only needs to be expended once for a given implementation but depending on the test generation strategy and the netlist characteristics, it may be infeasible to compute the required tests in a reasonable amount of time. It should be noted that this characteristic is only a disadvantage for the adversary. The trusted authority can pick-and-choose which paths to target for test generation (only a limited number of CRPs are stored in the secure database), and therefore, test generation time can be kept small.

HELP accepts 2-vector sequences as challenges and supports an exponential input challenge space, i.e., with n inputs, the number of challenges is upper bounded at $2^{2n}$, which indicates that any of the $2^n$ input vectors can be followed by any of the other $2^n$ input vectors. In order to improve the reliability of HELP, the 2-vector sequences are constrained to generate either rising transitions or falling transitions along the paths, but not both. This reduces the challenge space from $2^{2n}$ to $2*(3^n-2^n)$, which is still an exponential as required of a strong PUF. However, the number of unique paths is typically a smaller exponential $2^m$, which indicates that the 2-vector sequences re-test these paths approx. $2*(3^n-2^n)/2^m$ number of times on average. If the response space is defined as $2^m$, then m needs to be on order of 64 or larger to meet the conditions of a strong PUF. Although combinational logic circuits can be constructed to meet this condition, the resulting size is too large for resource constrained devices.

According to the invention, instead of storing response bitstrings on the server, path timing information, for example digitized representations of measured path delays, is stored in a database on a (secure) server enabling efficient authentication protocols that provide both privacy and mutual authentication. In combination with a set of processing parameters, the storage of path delays provides distinct advantages over response bitstrings by enabling multiple response bitstrings to be generated from the same set of path delays. In particular, a very large, exponential set, of response bitstrings may be generated using a fixed set of stored path delays on the verifier.

In particular, the invention expands the response space of HELP by defining a set of configuration parameters. The combination of the 2-vector sequences and these parameters increases the CRP space to a large exponential. For example, one of the configuration parameters is referred to as the Path-Select-Mask. It allows the verifier to select a specific subset of the paths, from those tested by the applied 2-vector sequences, to be used in the bitstring generation process. By itself, the Path-Select-Mask adds an n-choose-k number of possibilities to the size of the response space. The values of n and k are typically in the range of 5000 and 2048, respectively, which corresponds to a value larger than $3e^{1467}$.

According to one embodiment of the invention, the protocol is provided in a hardware implementation of a cryptographic primitive, specifically the Advanced Encryption Standard ("AES") algorithm. However any cryptographic hash function is contemplated, for example, Secure Hash Algorithm 3 ("SHA-3").

According to one embodiment, the invention uses an AES data path component referred to as sbox-mixedcol as the source of entropy. In particular, the sbox-mixedcol is a functional unit of a 32-bit column AES that includes 4 copies of the SBOX and 1 copy of the MIXEDCOL. However the protocol according to the invention may be demonstrated and implemented using a lighter-weight functional unit, for example, one consisting of single AES SBOX component. More generally, the invention may be extended to hardware encrypting engines as well as other types of data path components.

For purposes of illustrating the invention is capable of generating bitstrings of high statistical quality for use in PUF-based authentication protocols, data is collected from the sbox-mixedcol functional unit on 45 copies of the Xilinx Zynq 7020 FPGA, however any number of copies as well as any hardware such as ASIC is contemplated.

The invention also provides a set of configuration parameters— Mod, $\mu_{ref}$, $Rng_{ref}$, S, Margin, Path-Select-Mask— that create an exponentially large CRP space using a small set of measured path delays. The invention also provides Dual Helper Data ("DHD") algorithm for improving reliability.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 5A illustrates a flow diagram of an enrollment operation of an authentication protocol according to an embodiment of the invention.

FIG. 5B illustrates a flow diagram of authentication operation of an authentication protocol according to an embodiment of the invention.

FIG. 12 illustrates a table of HELP authentication protocol area and runtime overhead.

DETAILED DESCRIPTION OF THE INVENTION

The Hardware embedded Delay PUF ("HELP") is a strong PUF that leverages path delay variations in a functional unit as described in the following patent applications incorporated by reference: International Patent Application PCT/US14/053276 filed Aug. 28, 2014, and International Patent Application PCT/US15/065909 filed Dec. 15, 2015. In particular, HELP generates bitstrings from delay variations that exist within existing functional units and provides a large number of CRPs.

Figure 1:
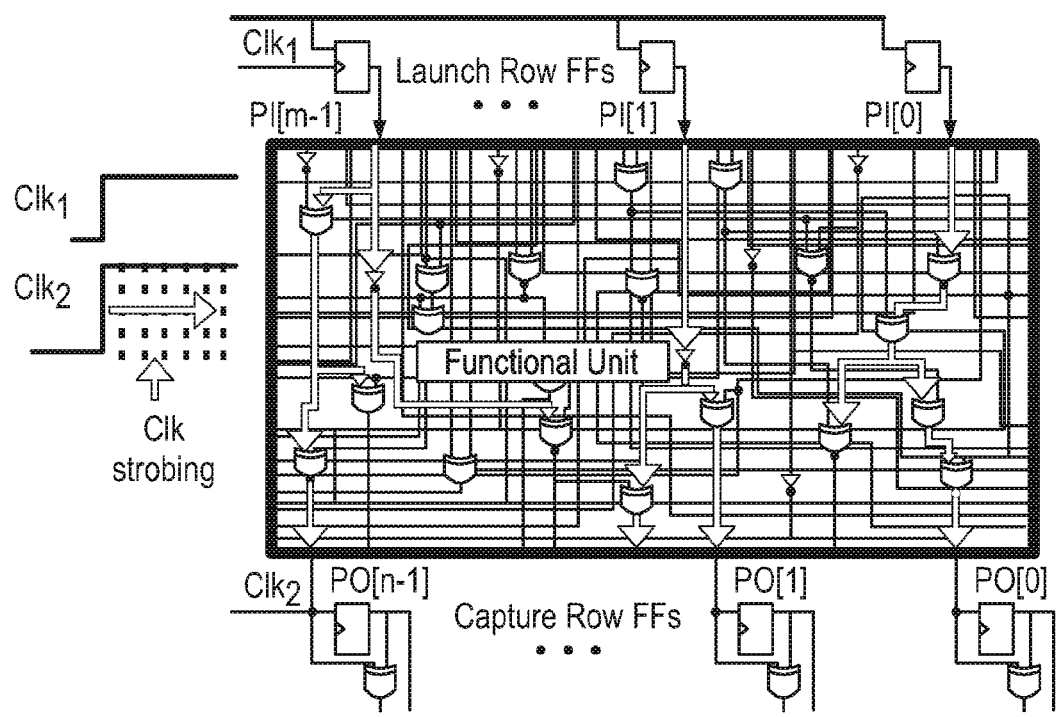
FIG. 1 is a block diagram of a functional unit ("FU") including clock strobing method for measuring path delays according to an embodiment of the invention.

The source of entropy (randomness) for HELP is the manufacturing variations that occur in the delays of paths that define the functional unit. HELP measures path delays using a clock strobing technique as illustrated in FIG. 1. The source of entropy is represented by the functional unit, which is an existing on-chip macro that implements, e.g., components of the authentication protocol, i.e., an integer divider or a cryptographic hash function.

As indicated above, a challenge for HELP consists of a 2-vector sequence and a Path-Select-Mask. The 'Launch Row FFs' and 'Capture Row FFs' are also components of the functional unit. The only modification required for the integration of HELP into the functional unit involves the use of a second clock, labeled $Clk_2$, which drives the Capture Row FFs, and the addition of the XOR gates on the primary outputs PO[x].

The 'Launch Row FFs' in FIG. 1 are used to apply the 2-vector sequences to the primary inputs PI[x] of the functional unit, while the 'Capture Row FFs' are used to measure the path delays at the primary ouputs PO[x]. The path delays are measured by applying a series of launch-capture clocking events (called clock strobing) using $Clk_1$ and $Clk_2$ as shown on the left side of FIG. 1. The first vector of the sequence represents the initialization vector. The application of the second vector generates a set of transitions which are timed by the clock strobing technique. The clock strobing technique requires the repeated application of the 2-vector sequence. For each repeated application of this 2-vector test sequence, the phase shift between $Clk_1$ and $Clk_2$ is increased by a small fixed $\Delta t$.

The phase shift value between the two clocks is digitally controlled, and is referred to as the launch-capture interval ("LCI"). The smallest LCI that allows the propagating edge along a path starting from a Launch FF to be captured in a capture FF—occurs when an XOR gate on the output becomes 0—is used as the digitized timing value for the path. The digital timing values for a large number of paths can be obtained by repeating the clock strobing operation for multiple 2-vector test sequences. In the following description, the LCI path timing value is referred as a "PUFNum" or "PN".

The signed difference of two randomly selected PNs is referred to as a "PNDiff" or "PND". HELP constructs PND by pairing each of the rising PNs with a falling PN using two linear-feedback shift registers ("LFSR"). The LFSRs are initialized with a pair of configuration parameters referred to as "LFSR seeds".

The authentication protocol according to the invention requires HELP to generate nonces in addition to the PNs. The VHDL module responsible for implementing the PN timing engine generates nonces in parallel with PN generation by leveraging the meta-stability characteristics that exist in a subset of the tested paths. Meta-stability is determined for a path by repeatedly measuring it and then analyzing the variations in the fractional component of the computed average. Those paths that produce two consecutive PN values nearly of equal frequencies are used as a source of true random numbers ("TRNG"). It should be noted that the random statistical properties associated with the nonces generated in this fashion pass all of the National Institute of Standards and Technology ("NIST") statistical test statistical tests.

It should be noted that the ability to dynamically control the fine phase shift of a Clk signal is a common feature of on-chip digital clock managers ("DCMs") in FPGAs. For example, Xilinx includes this phase shift capability even on their lowest cost FPGAs. For low-cost components that do not include a DCM, this phase shift capability can be implemented with a small area overhead using a multi-tapped delay chain.

The reliability of a PUF refers to the number of bit flip errors that occur when the bitstring is regenerated. Ideally, the bitstrings are precisely reproduced during regeneration but this is rarely possible with PUFs. The largest source of 'noise' that causes bit flip errors for PUFs is a change in temperature and/or supply voltage (TV noise). Although sample-averaging of path delays is effective at reducing measurement noise, this strategy is not effective for TV noise, and instead a TV compensation ("TVCOMP") method is required. The TVCOMP process is described by Equations (1) and (2):

$$zval_i = \frac{(PND_i - \mu_{token})}{Rng_{token}} \quad \text{Equation (1)}$$

$$PNDc = zval_i Rng_{ref} + \mu_{ref} \quad \text{Equation (2)}$$

Here, $zval_i$ represents a standardized PND after subtracting a mean $\mu_{token}$ and dividing by a range $Rng_{token}$, with $\mu_{token}$ and $Rng_{token}$ derived from the distribution of all PND obtained during regeneration under potentially adverse environmental conditions, referred to as TV corners. The individual zval are then transformed to a set of PNDc (with 'c' for compensated) using two additional configuration parameters, $\mu_{ref}$ and $Rng_{ref}$ (ref is for reference). This linear transformation is very effective at reducing TV noise. The noise from environmental variations that remain in the PNDc is called "uncompensated TV noise" or "UC-TVNoise".

The bitstring generation process uses the signed PNDc as a means of both hardening the algorithm against model building and increasing the diversity in the PUF responses. A "mod-PNDc" is defined by applying a Modulus to the PNDc. According to one embodiment of the invention, the Modulus is a fifth configuration parameter to the HELP algorithm (adding to the $\mu_{ref}$, $Rng_{ref}$ and LFSR seed parameters).

The modulus is necessary because the paths in the functional unit vary in length and this path length bias is captured in the PNDc. The modulus reduces the bias while fully preserving the within-die delay variations, i.e., the most important source of randomness.

Figure 2:
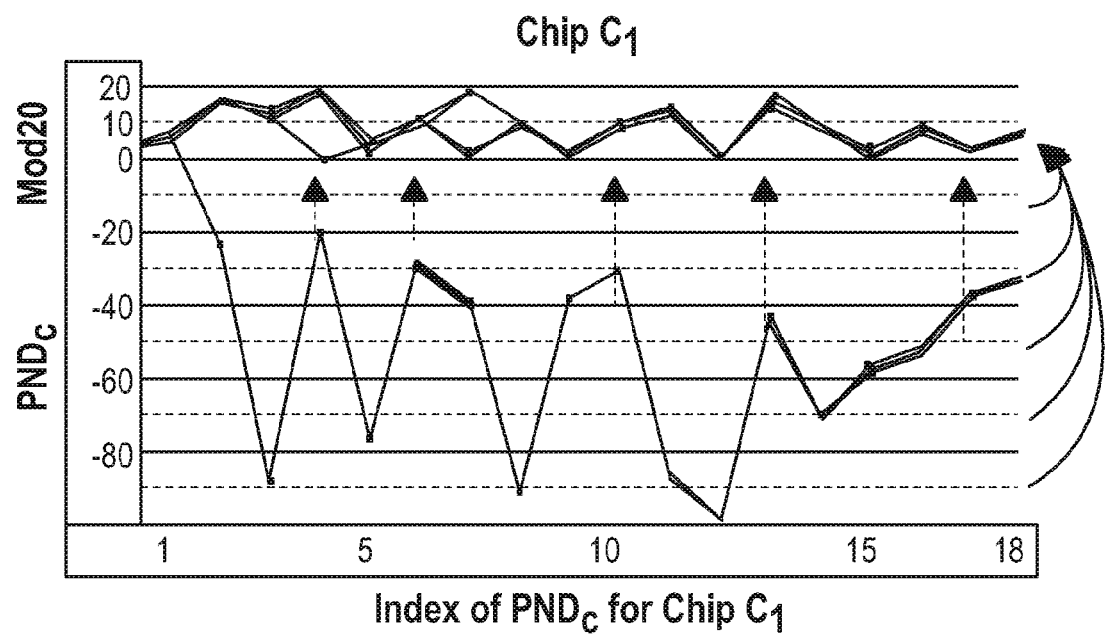
FIG. 2 is a graph illustrating random pairings of TV compensated rising and falling PUFNum Differences (PNDc) and PNDc with an applied Modulus ("modPNDc") according to an embodiment of the invention.

FIG. 2 shows a sample set of PNDc (18) computed from pseudo-random pairings of PN measured from chip $C_1$. Each PNDc is measured 16 times under different TV conditions. One curve line connects the data points obtained under enrollment conditions (25° C., 1.00V) while the remaining curve lines connect data points under a set of regeneration TV corners, for example, all combinations of temperatures −40° C., 0° C., 25° C., 85° C., 100° C. with supply voltages 0.95V, 1.00V and 1.05V. The top of FIG. 2 illustrates the modPNDc values after a Modulus of 20 is applied. The modPNDc is used in the HELP bitstring generation process described below.

Figure 3:
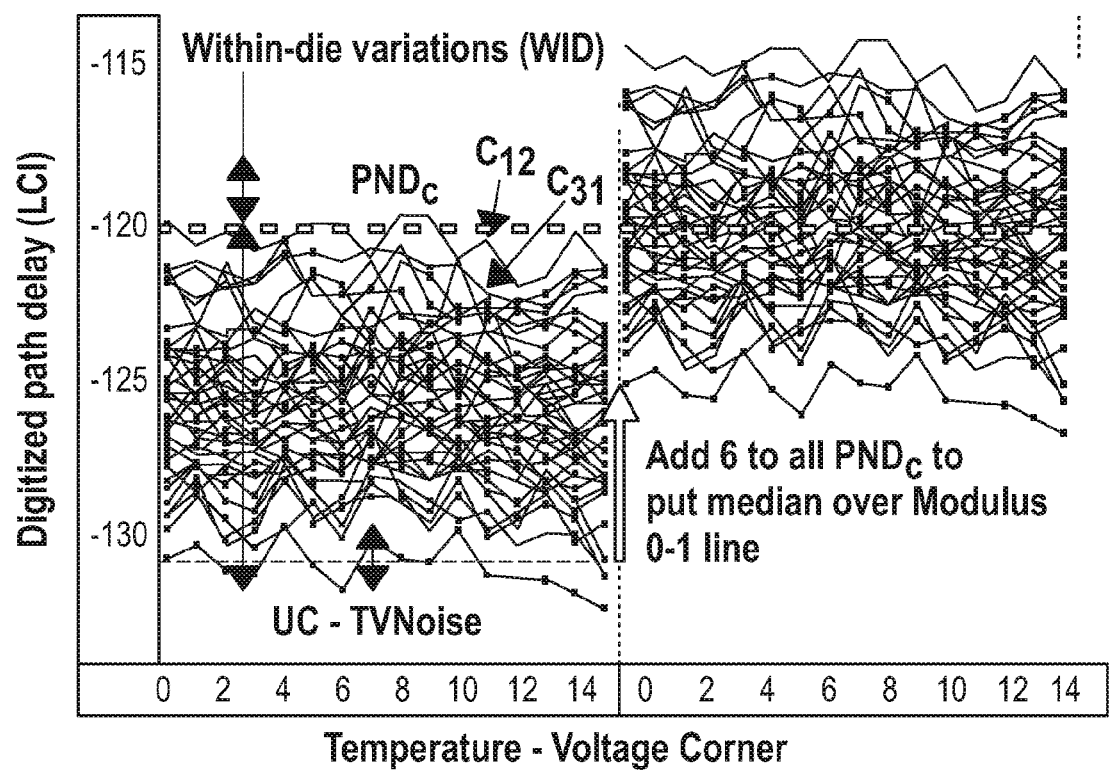
FIG. 3 is a graph illustrating temperature-voltage compensation ("TVCOMP") of PNDc and temperature-voltage ("TV") corners according to an embodiment of the invention.

According to the invention, an 'offset' technique may be used to further reduce bias effects, particularly when the Modulus is greater than the magnitude of the within-die variations. FIG. 3 provides a graph of a PNDc obtained from a set of 45 chips to illustrate the concept. The line connected points in each curve are generated by the same chip and represent the value of the PNDc measured in the 16 TV corner experiments after they has been TVCOMP'ed. The UC-TVNoise referred to earlier that remains after TVCOMP is annotated on the bottom-most curve. In contrast, within-die variations ("WID") are represented by the vertical extension of the individual curves, which is also annotated in FIG. 3. The magnitude of WID for this PNDc is approx. 11 LCIs. If a Modulus of 20 is used, then the position of this group of curves—shown between −131 and −120—represents a worst case scenario because the bit generated in the bitstrings (discussed below) would be the same for nearly all chips. The bias that creates this problem can be eliminated by adding a constant of 6 to the points in the all curves as shown on the right side of FIG. 3). This 'centers' the PNDc distribution over −120 and maximizes the entropy contained in this PNDc by making the number of chips which produce a '1' in the generated bitstrings nearly equal to the number that produce a '0'. The appropriate offset is computed by the verifier using the stored enrollment data and is encoded in the set of Path-Select-Mask sent to the token.

A Margin technique is used to improve reliability. The Margin technique identifies modPNDc that have the highest probability of introducing bit flip errors. The modPNDc data shown along the top of FIG. 2 is replicated and enlarged as shown by "(a)" in FIG. 4. The region defined by the Modulus is split into two halves, with the lower half used as the '0' region (between 0 and 9 in "(a)" of FIG. 4) and the upper half as the '1' region.

Without Margining, bit flips would occur at modPNDc indexes 4, 6, 7, 8, 10 and 14 because some of the values in the groups of PNDc data points from the 16 TV corner experiments cross over the 0-1 lines at 9-10 and 19-0. The Margin technique avoids these bit flip errors by creating weak and strong classes for the bits associated with the modPNDc. The bit associated with a modPNDc is classified as weak if the modPNDc falls within a margin around the 0-1 boundaries, and is classified as a strong bit otherwise. The margin is set ideally to the worst case UC-TVNoise level for the best results, but can be tuned to attain a specific probability of failure in the authentication protocol discussed further below.

Figure 4A:
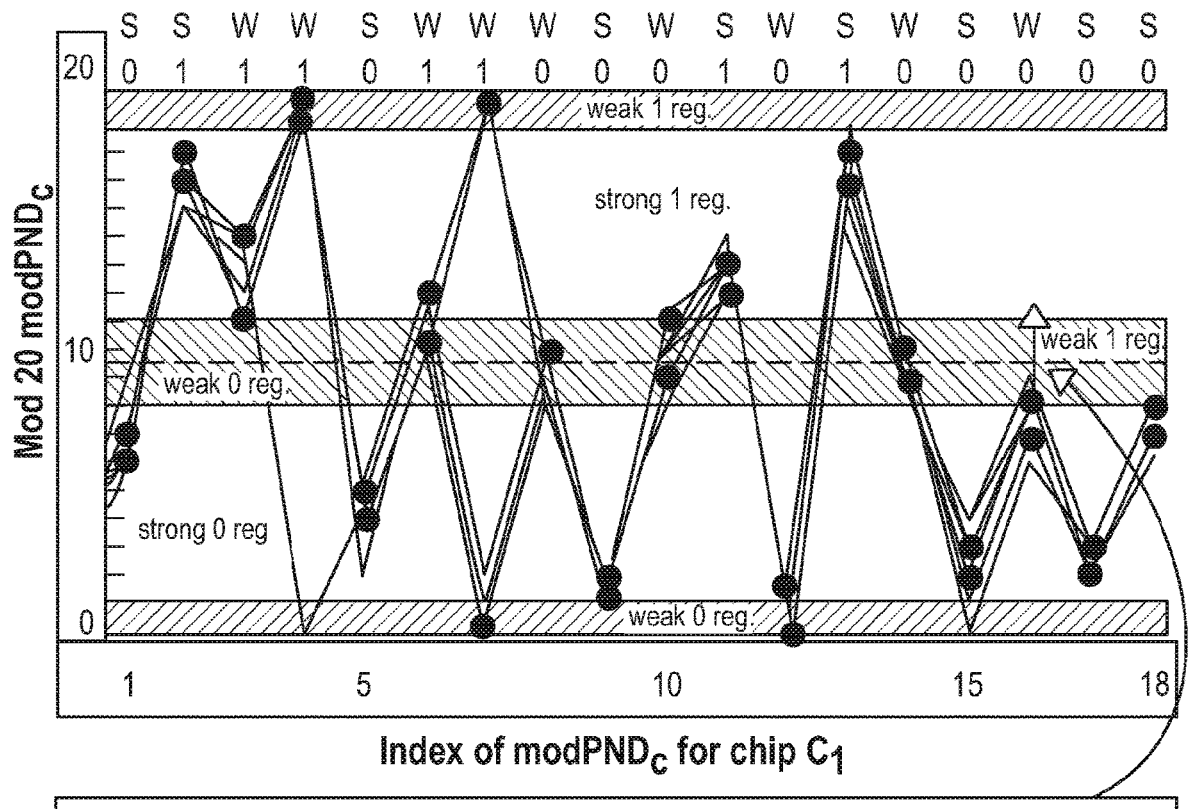
FIG. 4 illustrates a block diagram of a Margin and Dual Helper Data ("DHD") algorithm according to an embodiment of the invention.
Figures 4B, 4C:
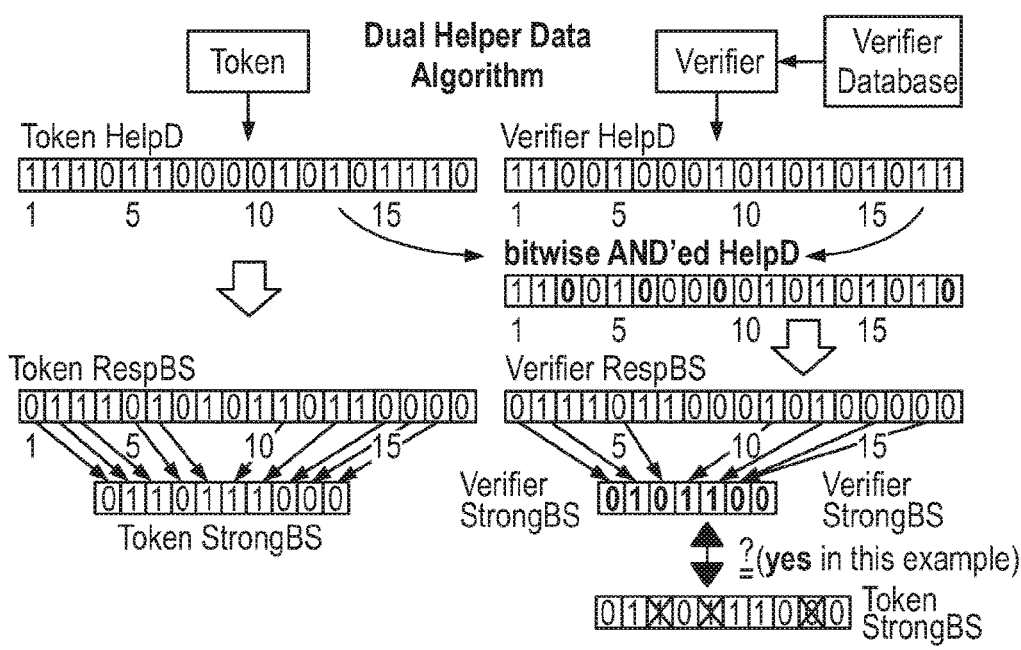

A Dual Helper Data ("DHD") algorithm is proposed as a means of further reducing bit flip errors. The helper data ("HelpD") and response bitstrings ("RespBS") for the hardware token are shown by "(b)" in FIG. 4, while "(c)" in FIG. 4 shows HelpD and RespBS for the verifier. The values are derived using the token and verifier highlighted data points from the modPNDc shown in "(a)" in FIG. 4.

Authentication in the field makes use of data stored earlier during enrollment in the Verifier Database. The following operations are carried out to generate the Token and Verifier StrongBS. First, the token generates helper data ("Token HelpD") using the Margining technique to produce the Token StrongBS, which are both transmitted to the verifier. For each token stored in the Verifier Database, the verifier computes helper data ("Verifier HelpD"), and then bitwise AND's it with the received Token HelpD. The verifier constructs the Verifier StrongBS using the AND'ed HelpD while simultaneously eliminating strong bits from the Token's StrongBS that correspond to Token HelpD bits that were changed from '1' to '0' during the AND operation (3 bits are eliminated in this example as shown along the bottom of "(c)" in FIG. 4). Lastly, the two StrongBS are compared. A successful authentication requires either an exact match between the Token and verifier StrongSB, or a 'fuzzy match' where a match is successful if most, but not all, of the bits match. The AND'ing of the token and verifier's HelpD bitstrings allows the margin to be reduced to approx. one-half of that required if the individual HelpD bitstrings were used by themselves. This is true because a bit flip error can only occur if UC-TVNoise causes a modPNDc to move across both margins, and into the opposite strong bit region, as shown by the caption and illustration in "(a)" of FIG. 4. If the modPNDc moves but remains in either the '1' or '0' weak bit regions, then the AND operation eliminates it. The smaller margins used with the DHD scheme allow the Modulus to be reduced, which in turn, allows better access to within-die variations.

A privacy-preserving, mutual authentication protocol is now discussed in detail. Path delay information, the PNs, is stored on the verifier instead of response bitstrings. As an example, the PNs can each be represented as a 15-bit values (which provides a range of +/−1024 with 4 bits of fixed-point precision).

The protocol employs several parameters, including a Modulus (also referred to as Mod), a $\mu_{ref}$ and $Rng_{ref}$ from Equations (1) and (2), a pair of LFSR Seeds (S), a Margin and a Path-Select-Mask, to allow multiple response bitstrings to be generated from a fixed set of PNs. The verifier specifies a set of paths in the Path-Select-Mask and encodes offsets in the unused bits to improve entropy as above.

A challenge is defined as a 2-vector sequence plus a Path-Select-Mask. A one-time interface (implemented on the FPGA as a special programming bitstring) is used during enrollment to allow the token to transfer PNs to the verifier. The protocol separates token identification (ID Phase) from authentication (Authen Phase) to support the privacy preserving component. The protocol does not require any cryptographic primitives nor non-volatile memory (NVM) on the token.

The enrollment operation is graphically illustrated in FIG. 5A. Prior to manufacture, automatic test pattern generation ("ATPG") is used to select a set of test vector sequences, {ck}, used as a common set of challenges for all tokens in the ID Phase. The number of vectors depends on the security requirements regarding privacy.

The common challenges are transmitted to the token in a secure environment during enrollment and applied to the functional unit's PIs. The token generated PN are transmitted to the verifier, annotated as $\{PN_j\}$ in FIG. 5(a). The verifier generates an internal identifier $ID_i$ for each token using VerifierGenID( ) and stores the set $\{PN_j\}$ under $ID_i$ in the secure database.

A similar process is carried out during the Authen Phase of enrollment except that a distinct set of ATPG-generated challenges are selected using SelectATPG($ID_i$) for each token. The number of hazard-free testable paths in typical functional units can be very large, making it possible to create minimally overlapping sets for each token (some overlap is desirable for privacy reasons as discussed below). Note that the task of generating 2-vector sequences for all paths is likely to be computationally infeasible for even moderately sized functional units. However, it is feasible and practical to use ATPG to target random subsets of paths for the enrollment requirements. The set of PNs, {PN$_j$}, as generated in the Authen Phase are also stored, along with the challenge vectors that are used, in the secure database under ID$_i$.

The fielded token authenticates using a 3-phase process, Phase 1 is token identification ("ID Phase), Phase 2 is verifier authentication ("Mutual Phase") and Phase 3 is token authentication ("Authen Phase"). The operations carried out in the ID Phase are shown graphically in FIG. 5B. The other two phases are nearly identical, with only the differences noted below.

The token initiates the process by transmitting a 'req. to authen.' signal to the verifier. The verifier generates nonce n$_2$ and transmits it to the token, along with a selected set of challenges ({ck} to the token. It should be noted that the transmitted challenges are typically a subset of those used during enrollment. The token generates a nonce n$_1$ and transmits it to the verifier. This prevents the adversary from constructing n$_2$ as a means of carrying out a systematic attack.

The token and verifier compute m=(n$_1$ XOR n$_2$) and use the m as an input parameter to the SelParam function. SelParam constructs the parameters Mod, S, μ$_{ref}$, Rng$_{ref}$, and Margin using bit-fields from m. The two LFSR Seed parameters Scan be derived directly from a bit-field in m. The remaining parameters are derived using a table lookup operation as a means of constraining them to specific ranges. For example, Mod is lower bounded by the Margin and is constrained to be an even number less than 30. Similarly, μ$_{ref}$ and Rng$_{ref}$ parameters are constrained to a range of fixed-point values. SelParam is carried out on the verifier in the same fashion.

Once the parameters are selected, the bitstring generation process is carried out First, the challenges {ck} are applied to generate a set {PN'$_j$}, referenced as PUF({ck}) in FIG. 5B. The PNDiff, TVCOMP and Modulus operations described above are then applied to the set of PNs using the AppParam procedure with parameters S, μ$_{ref}$, Rng$_{ref}$, and Mod parameters to generate the set (modPNDc'$_j$). Next, bitstring generation (BitGenS) is performed on the token using the Margining process described above and shown graphically by "(b)" in FIG. 4. BitGenS returns both a bitstring bss' that is composed of only strong bits under the constraints of the Margin and a helper data string h' Both bss' and h' are transmitted to the verifier.

The verifier carries out a search process by processing each of its stored token i data sets {PN$_j$}$_i$ using the same parameters. However the DHD scheme, denoted BitGenD in FIG. 5B, is used instead. BitGenD bitwise-ANDs the token's helper data h' with the helper data derived for each data set (not shown), and uses it to modify the token's bitstring bss' to bss" eliminating bits as needed (see bottom of "(c)" in FIG. 4) and to produce the verifier's StrongBS bss. Lastly, the verifier compares bss' with bss" and completes the ID Phase successfully if a match is found.

Although this is a compute-intensive operation for large databases because AppParam and BitGenD must be applied to each stored {PN$_j$}$_i$ in the database, the search operation can be carried out in parallel on multiple CPUs given the independence of the operations if needed.

As indicated, the search terminates when a match is found or the database is exhausted. In the latter case, authentication terminates with failure at the end of the ID Phase. Therefore, the ID Phase also serves as a gateway that prevents an adversary from depleting a token's authentication information on the verifier in a denial-of-service attack. In the former case, the ID$_i$ of the matching verifier data set is passed to Phase 2, verifier authentication ("Mutual Phase"), and Phase 3, token authentication ("Authen Phase"). In the Mutual Phase, the same process is carried out except the token and verifier roles are reversed and the search process is omitted. It is also contemplated that the challenges used in the ID Phase can be re-used and only SelParam run using two new nonces (n$_3$ XOR n$_4$). The Authen Phase is similar to the ID Phase in that the token is again authenticating to the verifier, but uses a 'token specific' set of challenges {cx}. Similar to the Mutual Phase, the search process is omitted. It is also contemplated that the Authen Phase can be omitted in applications that have lower security requirements, for example, RFID and home automation applications.

Note that token privacy is preserved in the ID Phase because, with high probability, the transmitted information bss' and h' is different from one run of the protocol to the next, given the diversity of the parameter space provided by the Mod, S, μ$_{ref}$, Rng$_{ref}$, Margin. This diversity is exponentially increased as discussed above through the use of the Path-Select-Mask. Moreover, by creating overlap in the challenges used by different tokens in the token authentication phase, tracking is prevented in this phase as well.

It should be noted that HELP uses an error avoidance scheme and therefore, the motivating factor for previously proposed reverse fuzzy extraction schemes—for example, reducing the computing burden associated with error correction on the token—does not exist for HELP. As a consequence, it is possible in HELP to implement an efficient helper data scheme in either direction, as proposed in the multiple phases of the authentication scheme.

The Mod, S, μ$_{ref}$, Rng$_{ref}$, Margin collectively represent parameters that can be varied within limits to create distinct bitstrings from a set of measured PNs. This feature of the proposed authentication scheme offsets the increased overhead associated with storing multi-bit PNs on the verifier as an alternative to response bitstrings. However, this scheme depends heavily on high statistical quality among the generated StrongBS. This section investigates StrongBS statistical quality using the standard metrics, including Intra-chip hamming distance ("HD$_{intra}$"), Inter-chip hamming distance ("HD$_{inter}$") and the NIST statistical test tools, as measures of bitstring reproducibility, uniqueness and randomness, respectively.

According to one embodiment of the invention, the protocol is provided in a hardware implementation of the Advanced Encryption Standard ("AES") algorithm using an AES data path component referred to as sbox-mixedcol as the source of entropy. In particular, the sbox-mixedcol is a functional unit of a 32-bit column AES that includes 4 copies of the SBOX and 1 copy of the MIXEDCOL.

Data is collected from the sbox-mixedcol functional unit on 45 copies of the Xilinx Zynq 7020 FPGA, however any number of copies as well as any hardware such as ASIC is contemplated. The implementation of sbox-mixedcol requires approx. 3000 LUTs on the Xilinx Zynq 7020 FPGA and provides approx. 8 million paths. However, the protocol has also been demonstrated using a lighter-weight functional unit consisting of single AES SBOX component that possesses approx. 600 LUTs, reducing the overall implementation size (HELP+functional unit) from approx. 6000 LUTs to less than 3000 LUTs.

In particular, a set of 4096 PNs are collected from the 45 chips at each of 16 TV corners. The enrollment data stored in the verifier database is collected at 25° C., 1.00V (nominal conditions), while regeneration data is collected at all combinations of the extended industrial-grade temperature-voltage specification limits for the parts, −40° C., 0° C., 25° C., 85° C., 100° C. and voltages 0.95V, 1.00V and 1.05V. A set of low-noise, high within-die variations paths are selected using Path-Select-Masks from approx. 600 rising and 600 falling 2-vector test sequences.

Test data is generated by applying a set of approx. 1200 challenges to test 2048 paths with rising transitions and 2048 paths with falling transitions. PNDs are created using LFSR-selected pairings of the 2048 rising and 2048 falling edge PNs. Each of the 2048 rising edge PNs can be paired with any of the 2048 falling edge PNs, yielding 4,194,304 possible combinations, however the following results are directed to a subset of 256 of these pairing combinations.

A 2-bit offset scheme, as discussed above, is applied to the PNDc to improve entropy. The verifier computes the offsets using stored enrollment data and uses it to shift the individual PNDc upwards by 0, ⅛, ¼, or ⅜ s the range given by the applied Modulus to better center the distribution over the 0-1 lines.

A set of Moduli between 10 and 30, in steps of size 2, and Margins of size 2 and 3, are also investigated. The minimum value of the Modulus is given by 4*Margin+2 because four weak regions are required as shown by "(a)" in FIG. 4 and the two strong bit regions must be at least of size 1. For example, the smallest Modulus for a Margin of size 3 is 14, so elements in the histogram for Modulus of 10 and 12 are 0.

The analysis reveals that of the 20 combinations of these parameters, 17 are useful. The only combinations that cannot be used are Modulus of 10 for Margin 2 and Moduli of 14 and 16 for Margin 3. As shown, the bitstring sizes are too small for these combinations of Margin and Moduli.

The analysis also investigates two of the scaling factor combinations given by the $\mu_{ref}$ and $Rng_{ref}$ parameters (see Equations (1) and (2)), in particular, the Mean and Maximum recommended values, which are derived from the individual distributions of the 45 chips. It is conservatively estimated that pre and $Rng_{ref}$ can be independently set to 10 different values between these Mean and Maximum values.

Given these bounds on the configuration parameters, it is possible to generate a total of 4,194,304*17*10*10~=7 billion different bitstrings using the same set of paths (PNs). As discussed above, the verifier also applies a Path-Select-Mask to each of the 2-vector sequences, which increases the number of possible bitstrings exponentially.

Inter-chip hamming distance is reported in two ways—Actual and True. In this section, $HD_{inter}$ is computed using the StrongBS produced after the application of the DHD method described above.

A set of StrongBS are created by AND'ing pairs of Helper Data bitstrings as follows. First, the enrollment modPNDc is used to create a set of 45 Helper Data bitstrings for each of the 45 chips. Second, Helper Data is computed using the modPNDc collected under each regeneration corner for these 45 chips. For each chip, the enrollment Helper Data bitstring is AND'ed with the corresponding regeneration Helper Data bitstrings.

The 45*15 AND'ed Dual Helper Data bitstrings are used to create a corresponding set of StrongBS using the method shown in "(b)" and "(c)" of FIG. 4. It should be noted that the DHD method creates variable-sized bitstrings. The smallest bitstring is used that is produced by one of the chips in the $HD_{interA}$ analysis. The smallest bitstring sizes are analyzed and discussed below.

$HD_{interA}$ is computed using the following equation:

$$HD_{interA} = \frac{1}{CC \times B \times T} \sum_{t=1}^{T} \sum_{i=1}^{C} \sum_{j=1}^{C} \sum_{k=1}^{B} (StrongBS_{i,t,k} \otimes StrongBS_{j,t,k}) \times 100$$

Equation (3).

B and NC represent 'number of chips' (45), 'number of regeneration TV corners' 'number of bits' (smallest bitstring size) and 'number of chip combinations' (45*44/2=990), respectively. Equation (3) simply sums all the bitwise differences between each of the possible pairing of chip StrongBS, and then converts the sum into a percentage by dividing by the total number of bits that were examined. $HD_{interA}$ is computed in this fashion for each of the 256 seeds and averaged.

Figure 6A:
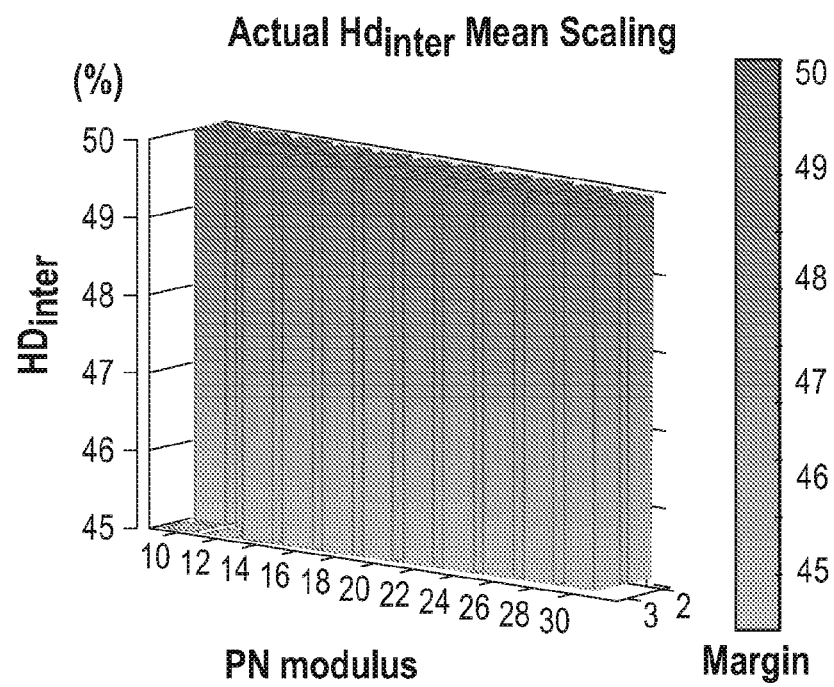
FIG. 6A illustrates a graph of actual inter-chip hammering distance results using a Mean scaling factor according to an embodiment of the invention.
Figure 6B:
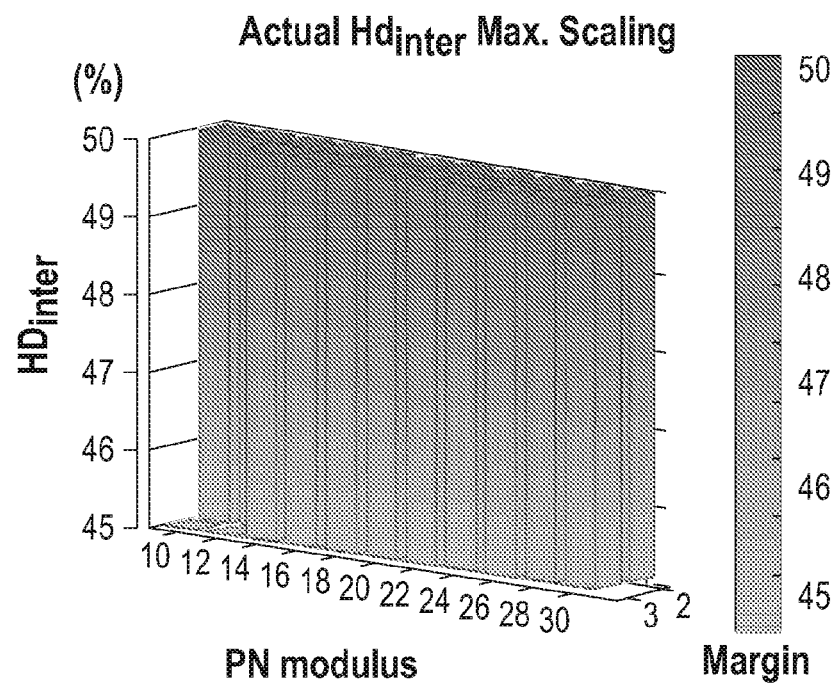
FIG. 6B illustrates a graph of actual inter-chip hammering distance results using a Max. scaling factor according to an embodiment of the invention.

The $HD_{interA}$ are shown in FIG. 6A and FIG. 6B for each of the Moduli and Margin combinations using Mean and Max. scaling factors for $\mu_{ref}$ and $Rng_{ref}$. The height of the bars are all very close to the ideal of 50%. Although an excellent result, this approach to computing Interchip-HD differs from the traditional approach because corresponding positions in the bitstrings are generated from different mod-PNDc. The results using the traditional approach, i.e., where the positions of the modPNDc are preserved in the bitstrings, are discussed below.

Figure 7A:
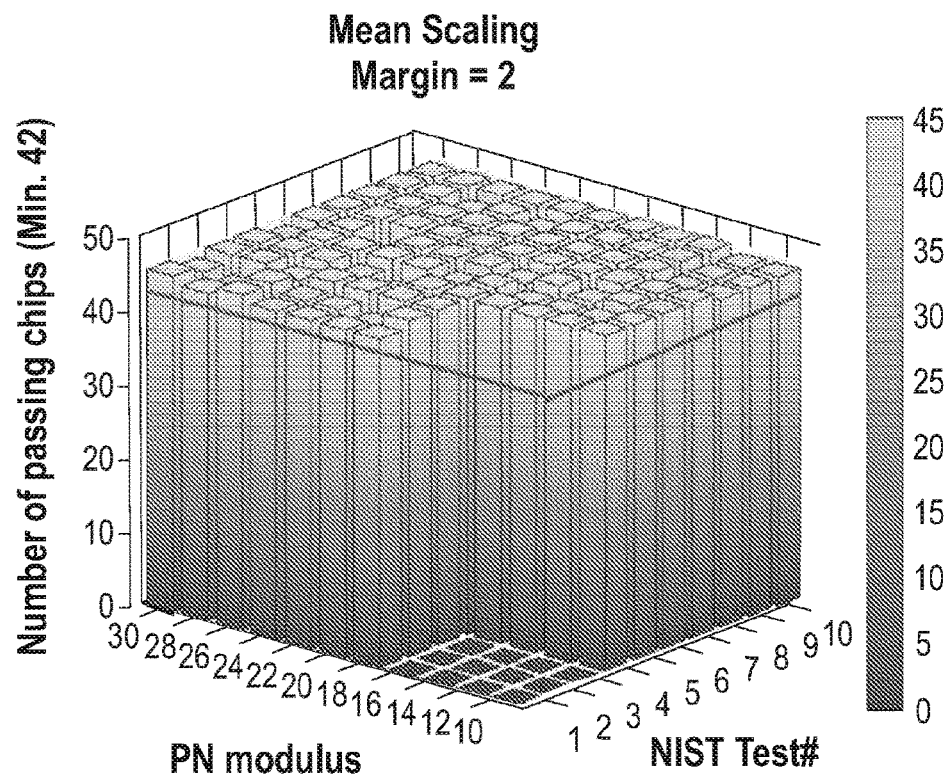
FIG. 7A illustrates a graph of National Institute of Standards and Technology ("NIST") statistical test results for a Margin of 2 using a Mean scaling factor according to an embodiment of the invention.
Figure 7B:
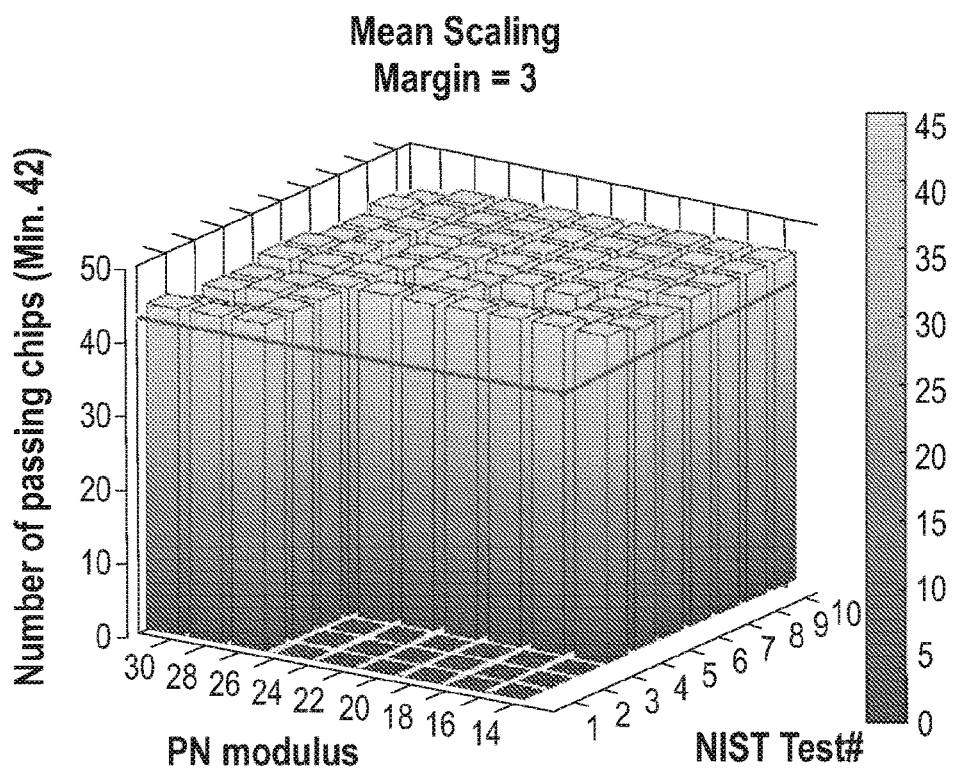
FIG. 7B illustrates a graph of NIST statistical test results for a Margin of 3 using a Mean scaling factor according to an embodiment of the invention.

The StrongBS referenced above are used as input to the NIST statistical test suite. The results using Mean Scaling and only 1 of the 256 LFSR seed pairs are presented in FIG. 7A and FIG. 7B, for Margins of 2 and 3, resp. (the results for other configuration parameters are very similar). NIST test criteria classifies a test category as passed if at least 42 of the 45 chips pass the test. The figure shows all bars are above the threshold line at 42, and therefore all test categories are passed. Bars of height 0 for NIST Tests 1, 2 and 3 identify Moduli that produced bitstrings with sizes less than the NIST requirement for those tests. The pass percentage when the NIST tests are applied to the bitstrings produced from all combinations of the investigated parameters is approx. 98.8%.

Figure 8A:
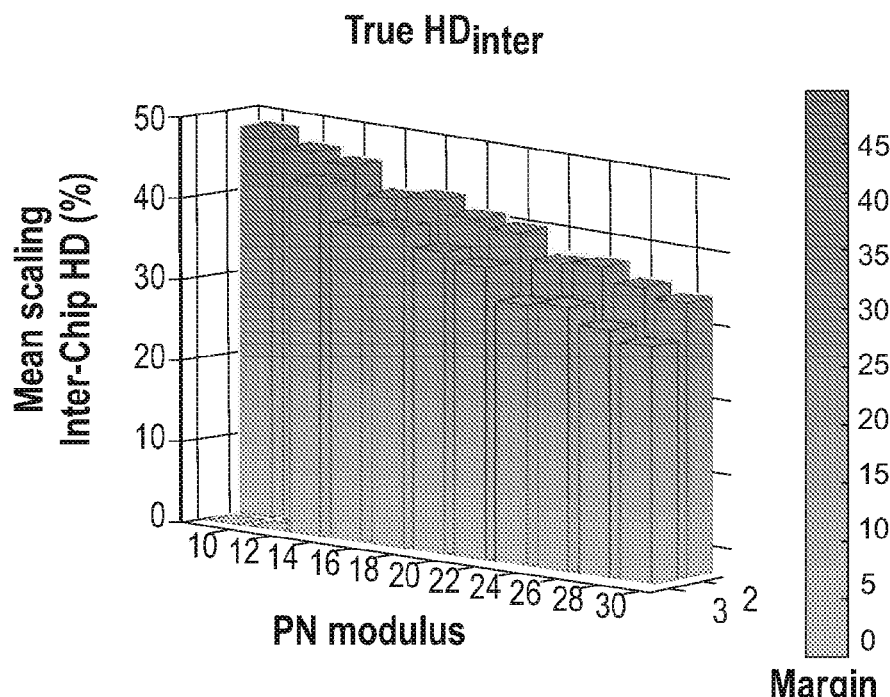
FIG. 8A illustrates a graph of true inter-chip hammering distance results using a Mean scaling factor according to an embodiment of the invention.
Figure 8B:
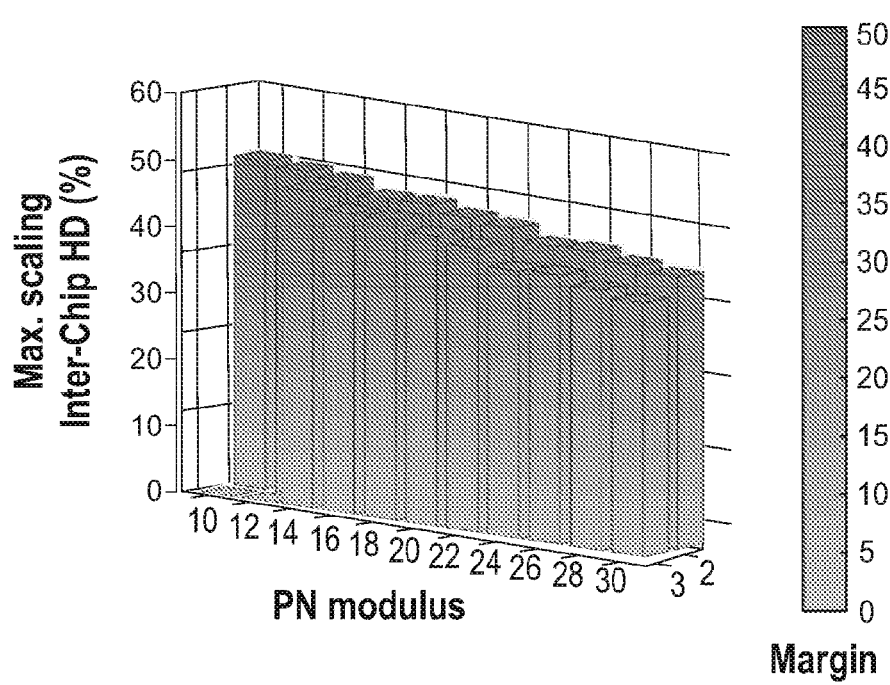
FIG. 8B illustrates a graph of true inter-chip hammering distance results using a Max. scaling factor according to an embodiment of the invention.
Figure 9A:
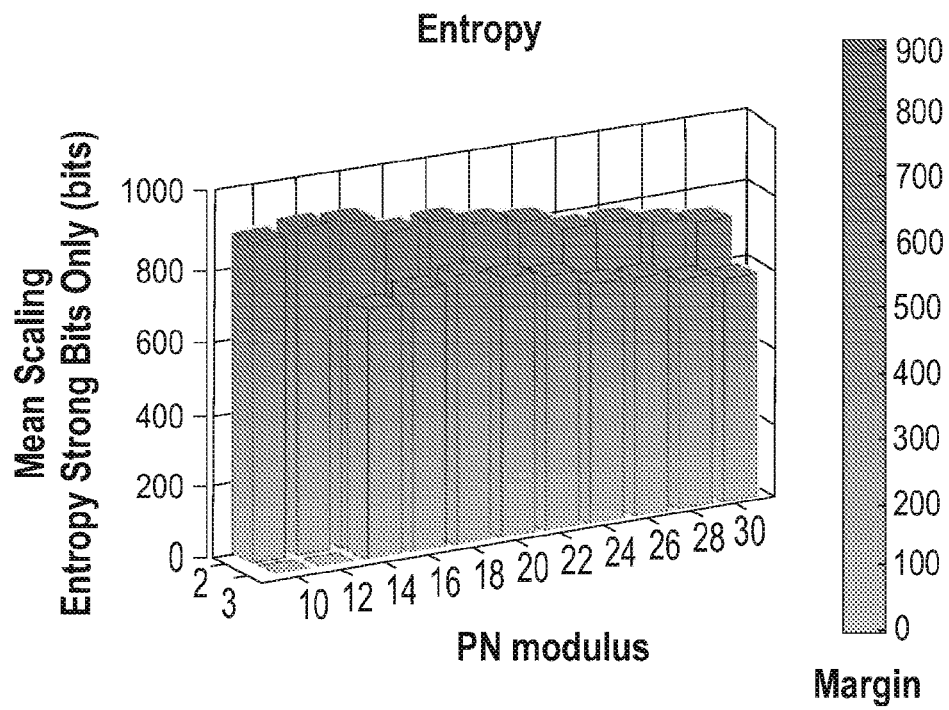
FIG. 9A illustrates a graph of entropy results using a Mean scaling factor according to an embodiment of the invention.
Figure 9B:
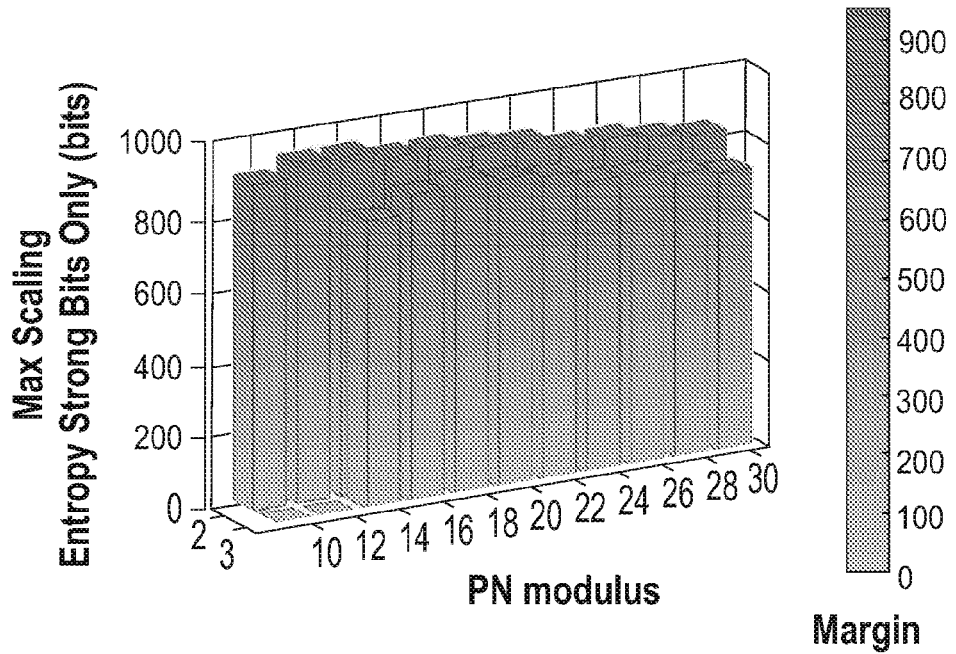
FIG. 9B illustrates a graph of entropy results using a Max. scaling factor according to an embodiment of the invention.
Figure 10A:
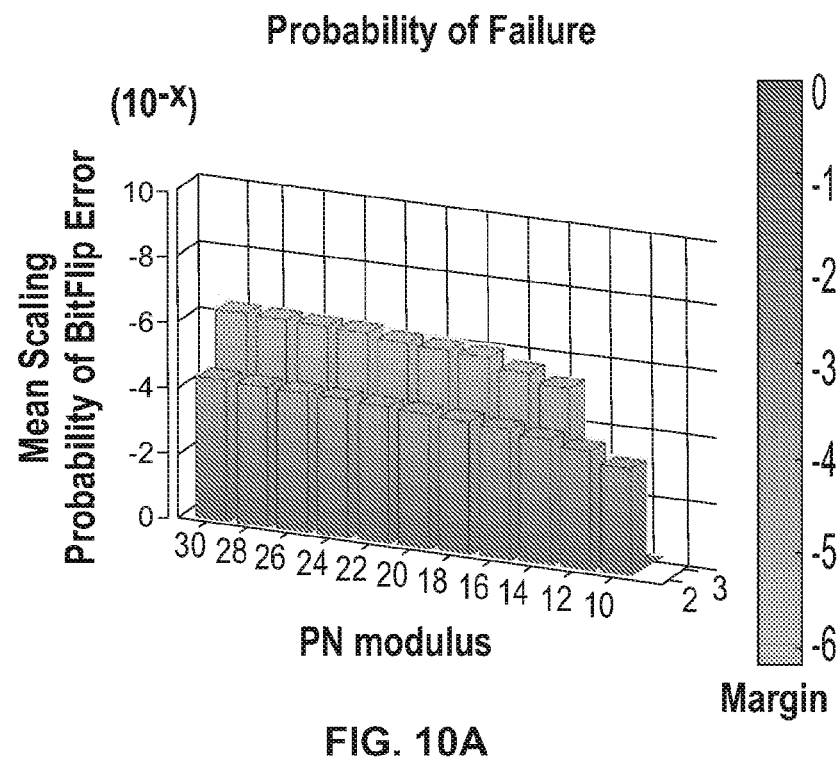
FIG. 10A illustrates a graph of probability of failure results using a Mean scaling factor according to an embodiment of the invention.
Figure 10B:
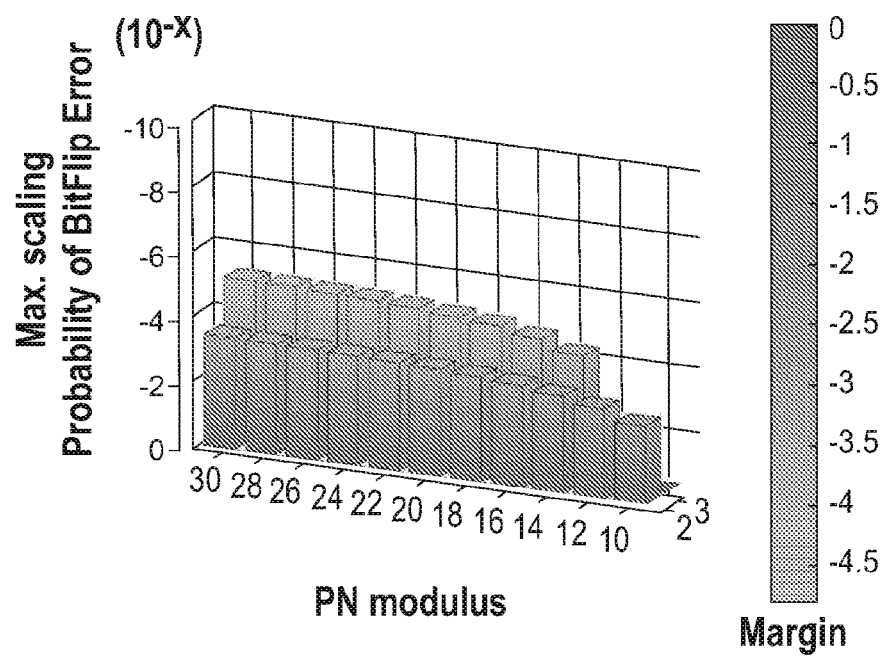
FIG. 10B illustrates a graph of probability of failure results using a Max. scaling factor according to an embodiment of the invention.
Figure 11A:
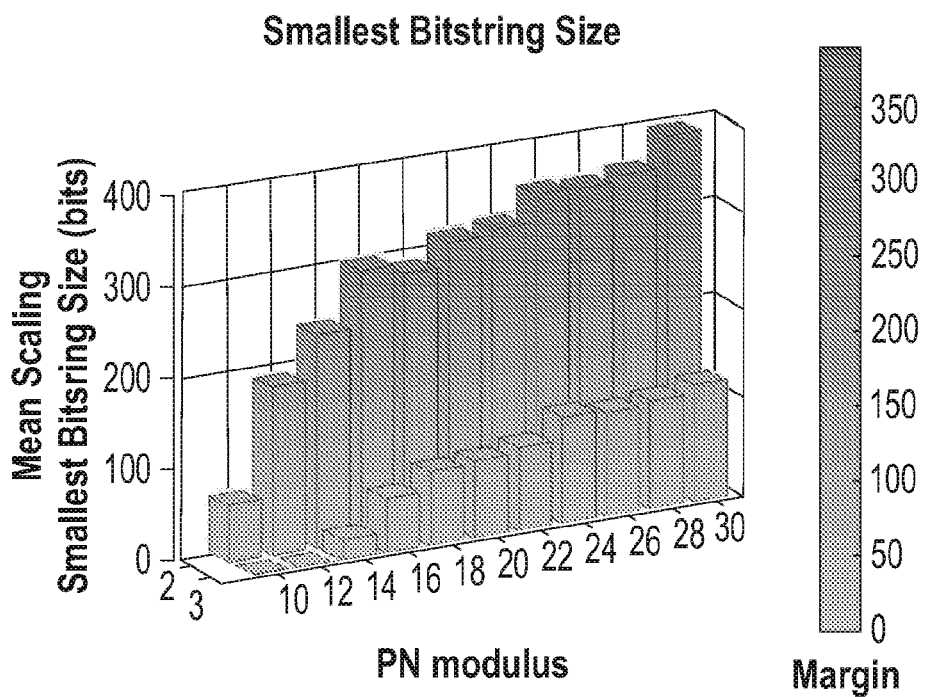
FIG. 11A illustrates a graph of smallest bitstring size results using a Mean scaling factor according to an embodiment of the invention.
Figure 11B:
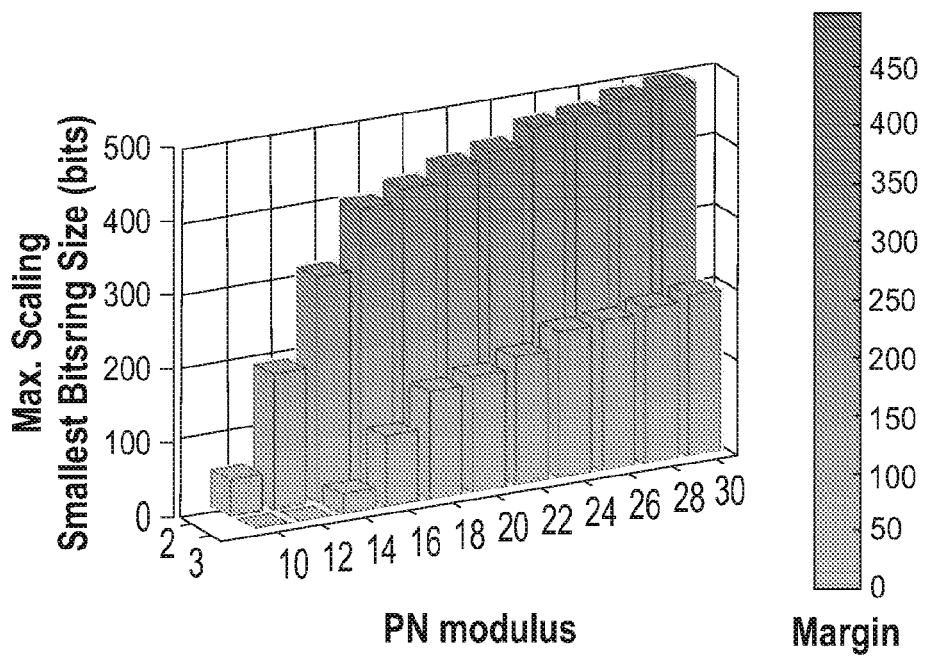
FIG. 11B illustrates a graph of smallest bitstring size using a Max. scaling factor according to an embodiment of the invention.

FIG. 8A and FIG. 8B each illustrate a graph of true inter-chip hammering distance results using a Mean scaling factor and a Max. scaling factor according to the invention. Entropy results using a Mean scaling factor and a Max. scaling factor are shown in FIG. 9A and FIG. 9B. FIG. 10A and FIG. 10B each illustrate a graph of probability of failure results using a Mean scaling factor and a Max. scaling factor according to the invention. The smallest bitstring size results using a Mean scaling factor and a Max. scaling factor according to the invention are shown in FIG. 11A and FIG. 11B.

Similar to $HD_{interA}$, $HD_{interT}$ is computed as the average percentage across 990 pairings of bitstrings and 256 different pairs of LFSR seeds. However, the full length bitstrings of length 2048 are used and for each pairing of bitstrings, the hamming distance is computed using only bits classified as strong in both bitstrings. Under the Mean scaling factor, the $HD_{interT}$ vary from 30% to 50% with the smallest value of 30.2% for Margin 3 and Modulus 30 as shown by FIG. 8A. For the Max scaling, most of the $HD_{interT}$ values are between 40% and 50% with the smallest value of 38.7% as shown by FIG. 8B. These results are also very good and indicate that a 2-bit offset can be used effectively with this range of Moduli.

Similarly, entropy is computed using the strong bits from each enrollment-generated bitstring of length 2048 and the following equation:

$$H(X) = -\Sigma_{i=1}^{n} p_i \log_2(p_i) + (1-p_i)\log_2(1-p_i) \quad \text{Equation (4)}.$$

The frequency $p_i$ of '1's is computed as the fraction of '1's at each bit position using only those chips of the 45 which identify the bit as strong. The entropy values vary over a range from approx. 1240 to over 1900. The ideal value is 2048 in this analysis so these results indicate that each bit contributes between 0.60 and 0.93 bits of entropy.

The Probability of Failure is reported as an exponent x from 10-x with a value of -6 indicating 1 chance in 1 million. The $HD_{intra}$ is computed by pairing the enrollment StrongBS for each chip against each of the 15 regeneration StrongBS under the DHD scheme and then counting the differences (bit flips) across all combinations of the 15 DHD-generated bitstrings. The number of bit flips for all chips are summed and divided by the total number of bits inspected. An average $HD_{intra}$ is then computed using this process across a set of 256 LFSR seed pairs, which is then converted into an exponent representing the Probability of Failure. The results show that the Probability of Failure varies between 10-2 and 10-4, with the largest (worst case) value at 10-2.4. Therefore, less than 1% of the bits for any authentication differ between the token and verifier under worst case environmental conditions.

The smallest StrongBS sizes are shown in the FIG. 11A and FIG. 11B. Using the condition that at least 80 bits are needed to meet the de facto lightweight security standard, the only parameter combinations that fail to meet this criteria are those noted above, i.e., Modulus of 10 for a Margin of 2 and Moduli of 14 and 16 for a Margin of 3.

FIG. 12 gives the resource utilization and runtime overhead associated with the ID Phase and Mutual Phase of the protocol. The table shown in FIG. 12 lists the resources in the order in which they are used by the authentication protocol, with '-' indicating repeated use of resources previously listed. The totals at the bottom indicate that area overhead is 6038 LUTs and 1724 FFs while the runtime is approx. 1.25 seconds. An alternative, lighter-weight implementation which uses only a single AES SBOX component yields an area overhead of 2909 LUTs and 952 FFs and a runtime of approx. 2.2 seconds.

The implementation of HELP also requires an 18-bit multiplier and an on-chip BRAM memory of size 7.5 KBytes. The Xilinx IP blocks used in the implementation include a MMCM and a dual-channel (64-bits) AXI-GPIO for implementing communication between the processor and programmable logic components of the Zynq 7020 FPGA. The runtime is measured using an 8-core 3.4 GHz Intel i7 desktop computer as the verifier. The authentication time of 1.25 seconds includes network transmissions between the token and verifier. The exhaustive search carried out on the verifier takes approx. 300 microseconds per entry in the database. The runtime reported uses a database with only a single entry. Therefore, applications that incorporate a relatively small number of tokens (10K or less) require a search time of approx. 1.5 seconds on average, and a total authentication time of approx. 2.75 seconds.

Security properties of HELP that relate to its resistance to model building and to the size of its CRP space are now discussed. The response space refers to the number of bitstrings that each token can generate using the six user-defined parameters described above. The security analysis assumes the verifier securely stores the token's timing information that is collected during enrollment, encrypting it if necessary.

As mentioned previously, the size of the challenge space is $2*(3^n-2^n)$ 2-vector sequences, and the number of response bitstrings is approx. 7 billion excluding the diversity introduced by the Path-Select-Mask. The ($n_1$ XOR $n_2$) operation used in the protocol does not allow direct control over these configuration parameters. The Path-Select-Mask increases the number of possible response bitstrings exponentially by changing the set of PNs used in the bitstring generation process. These characteristics of HELP and the protocol collectively add significant resilience to model-building attacks.

Two additional factors further increase HELP's model building resistance. The first is referred to as the 'distribution effect'. The PNs selected by the Path-Select-Mask change the characteristics of the PND distribution, which in turn impacts how each PND is transformed through the TVCOMP process (the TVCOMP process was described earlier in reference to Equation (1) and Equation (2)). In particular, Eq. 1 uses the Ptoken and $Rng_{token}$ of the measured PND distribution to standardize the PNDs before applying the reverse transformation given by Equation (2). The first transformation makes the final PNDc values dependent on the other components of the PND distribution. Therefore, machine learning techniques designed to learn the relative path delays as a mechanism to 'break the PUF' need to account for this 'distribution effect'.

With the physical model for HELP being more complex than the models developed for the arbiter PUF, it is likely that machine learning (ML) algorithms require much larger training sets to achieve good prediction capability, if it is possible at all. This is true for several reasons. First, the adversary is required to run automatic test pattern generation (ATPG) to generate the vector pairs used in the training phase of the ML attack. Although this is a one-time cost, ATPG requires long runtimes and commonly fails to find vector pairs that test paths in a hazard-free robust manner, which is required to eliminate uncertainty about which path is actually being tested during the training phase. Second, a level of uncertainty will always remain because not all paths are hazard-free robust testable. In particular, the path that dominates the timing for cases where paths reconverge and have nearly equal nominal delays will be different from chip-to-chip. Third, ML algorithms such as Probably Approximately Correct ("PAC") that have been effective against arbiter PUFs, guarantee success only when the model is polynomial in size.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A Physically Unclonable Function (PUF) method for authenticating a token by a server to prevent cloning and unauthorized use of Integrated Circuits, the method providing both privacy and mutual identification between the server and the token, the method comprising the steps of:
   measuring, by the PUF, natural variations that occur in one or more path delays of the PUF;
   digitizing the measured one or more path delays;
   storing in a database of the server, the digitized measured one or more path delays;

generating a plurality of bitstrings from the digitized measured one or more path delays;

comparing the bitstrings of the plurality to bitstrings of the token; and authenticating the token when the comparing step results in one or more matches.

2. The method according to claim 1, wherein the plurality of bitstrings is generated on-the-fly.

3. The method according to claim 1 further comprising the step of generating by the token both a token helper data bitstring and a token bitstring.

4. The method according to claim 3 further comprising the step of generating by the server both a server helper data bitstring and a server bitstring.

5. The method according to claim 4 further comprising the steps:

modifying the token bitstring by eliminating one or more bits from the token bitstring; and modifying the server bitstring by eliminating one or more bits from the server bitstring.

6. The method according to claim 5, wherein the modified server bitstring is compared to the modified token bitstring to authenticate the token.

7. The method according to claim 5, further comprising the step of using the server helper data bitstring to modify the server bitstring and using the token helper data bitstring to modify the token bitstring.

8. The method according to claim 5 further comprising the steps of:

performing an operation to bitwise AND the token helper data bitstring from the token to obtain a AND'ed token helper data bitstring; and performing an operation to bitwise AND the server helper data bitstring to obtain a AND'ed server helper data bitstring.

9. The method according to claim 8, wherein the one or more bits eliminated from the token bitstring are bits that correspond to bits in the AND'ed token helper data bitstring that are logic 0 because of the bitwise AND operation, and the one or more bits eliminated from the server bitstring are bits that correspond to bits in the AND'ed server helper data bitstring that are logic 0 because of the bitwise AND operation.

10. The method according to claim 1, wherein the PUF is provided in a hardware implementation of a cryptographic primitive.

11. The method according to claim 10, wherein the cryptographic primitive is an Advanced Encryption Standard ("AES") algorithm.

12. The method according to claim 10, wherein the cryptographic primitive is a Secure Hash Algorithm 3 ("SHA-3").

* * * * *